Figure 1:
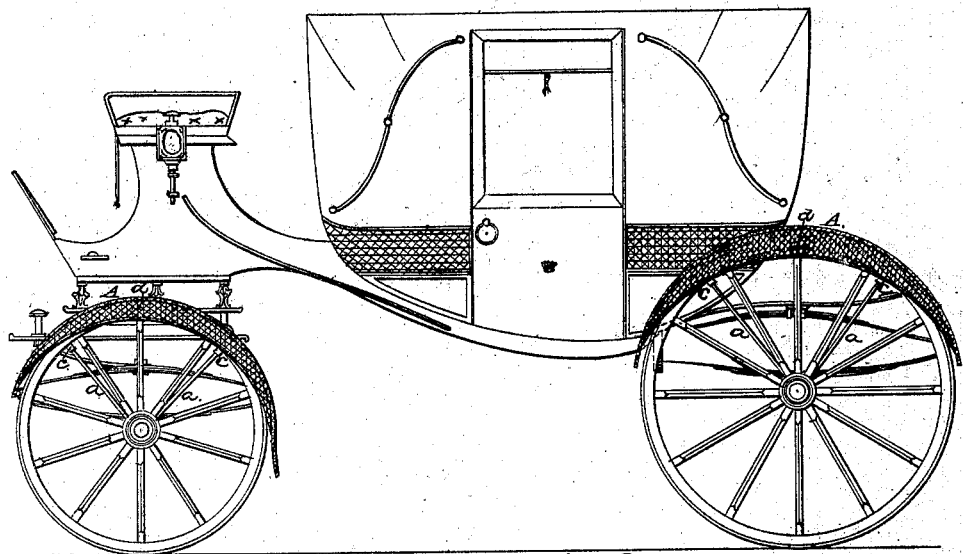

2 Sheets—Sheet 1.

J. M. SINGER.
Carriage-Fender.

No. 61,883.   Patented Feb. 5, 1867.

Witnesses:

Inventor.

2 Sheets—Sheet 2.
J. M. SINGER.
Carriage-Fender.
No. 61,883. Patented Feb. 5, 1867.
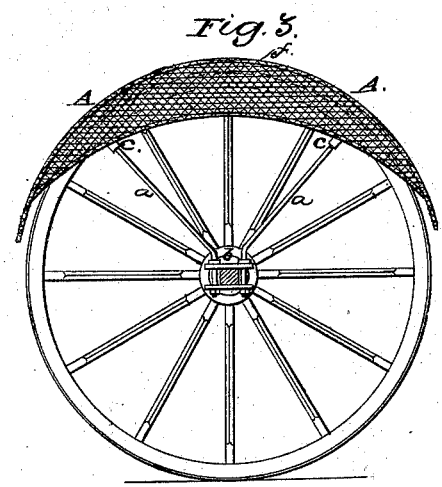
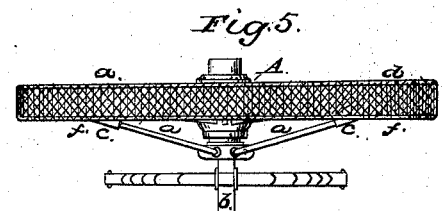
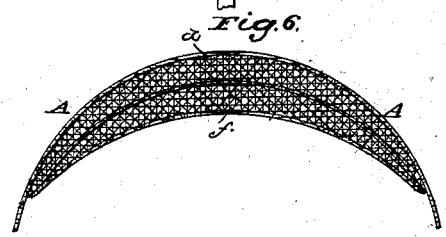
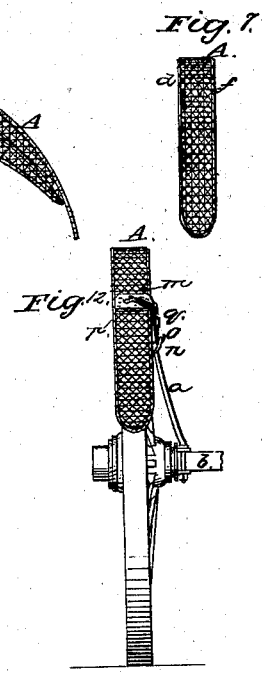
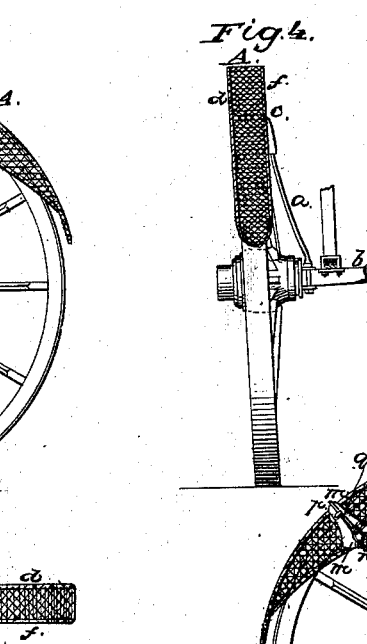
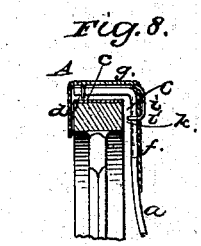
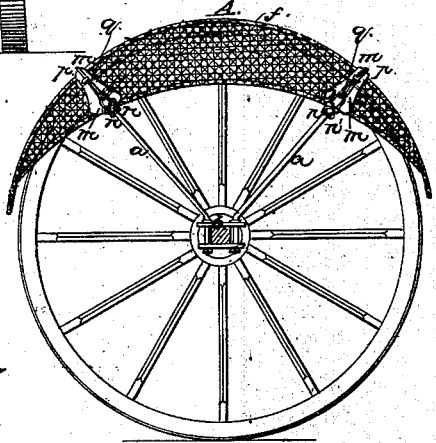
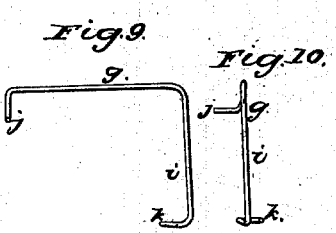
Witnesses.
Inventor.

United States Patent Office.

I. M. SINGER, OF PARIS, FRANCE.

Letters Patent No. 61,883, dated February 5, 1867.

---

IMPROVEMENT IN GUARDS FOR CARRIAGES.

---

The Schedule referred to in these Letters Patent and making part of the same.

---

TO WHOM IT MAY CONCERN:

Be it known that I, I. M. SINGER, a citizen of the United States of America, but now residing in Paris, in the empire of France, have invented certain new and useful Improvements in Guards for Carriages; and I hereby declare the following to be a full, clear, and exact description of the same, reference being had to the accompanying drawings.

My invention relates to the guards which are attached to carriages to prevent the mud and dirt taken up by the wheels from being thrown upon the body of the carriage and bespattering the occupants. The guards hitherto in use but imperfectly answer the purpose for which they are designed. They are attached to the body of the carriage, so that they cannot maintain the same proximity or relative position to the wheels, and, as a matter of course, they must be placed at some distance from the wheels, so as not to interfere with them during their various changes of position with respect to the body of the carriage. My invention principally consists in securing the guards to the axle-tree of the vehicle, or to that part which directs the movement of the wheels or moves in unison with them, so that, no matter in what position the wheels are turned, their relations to the guards shall be unchangeably the same. From this first feature of my invention, it follows that I can, without trouble, cover that portion of the rim and tire of the wheel to which the mud is most likely to adhere, and from which it is thrown up in the carriage, and to this end my invention further consists in forming a carriage-guard or hood which covers or encloses within it three sides of the wheel, and effectually prevents the mud from reaching the body of the carriage. This hood is made so as to be detached, and it may be ornamented by having false covers of silk, cloth, leather, or other desired material, which can be put on or taken off by means of buttons or hooks such as are used by carriage makers. The guards are held in place by one or more arms, which are fastened at their base to the axle-tree or its equivalent, or they may be held by the clips that hold the springs to the axle-tree, or the ends of the arms themselves may form the clips; other suitable means, some of which are represented in the drawings, may also be employed.

Figure 2:
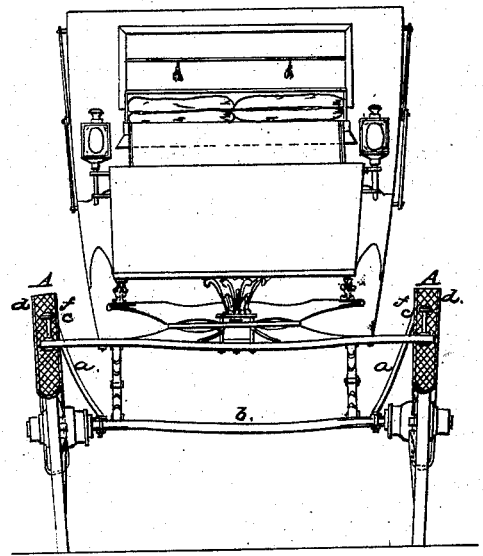

Figures 1 and 2, sheet 1, represent a front and side elevation of a carriage to which my invention is applied, the guards being supported on the axles, and enveloping the upper part of each wheel.

Figures 3–12, sheet 2, represent not only the method of securing the guards to the axle, but also the means employed to render it detachable, so that it can be removed whenever it is necessary to clean or to change it, or to wash the wheels. Each guard is supported by two metallic arms, $a\ a$, which are attached to the axle-tree by screws, nuts, or other means, near the hub of the wheel.

Figures 3, 4, and 5, respectively, represent a front and side elevation, and plan view of the arms attached to the axle $b$. The upper part, $c$, of each arm is bent at right angles, so as to form a support for the top and one of the sides of the hood A.

The guard A, shown separately in Figures 6 and 7, may be of willow, metal, or other material; it encases the upper part of the wheel. The two cheeks $a$ and $f$ are brought down over each side of the wheel; the interior cheek $f$, that is to say, that which is nearer the carriage, descends lower than the cheek $a$, in order to better protect the occupants of the carriage from the mud. The bent parts $c$ of the arms $a$ have applied to them rubber, leather, or other material, in order to prevent friction or wear, and noise. For the same reason, a like material is interposed between the guards and the bent parts $c$.

Figure 8 represents in section the position occupied by the guard on one of the wheels of the carriage.

Other means can be employed for holding the guards in place in such manner that they may be detached and removed with ease; two of these means are below indicated. The first, and very simple means, for holding the guard on the wheel, is represented in section in fig. 8, the attaching device being shown separately in Figures 9 and 10. This device consists of a metal rod or wire, composed of two arms, $g$ and $i$, each end of which is curved or bent in the form of a hook, $j$ and $k$. The arm $g$ is intended to be placed between the angular part $c$ and the upper face of the guard; the other arm $i$, which is perpendicular to it, runs along the interior cheek $f$ of the guard A. To secure the hood or guard A on the supports $a\ a$, I proceed as follows: The curved end or hook $j$ of the device is introduced in a little opening, $l$, made in the interior cheek $f$, where it meets the top of the guard, and engages with or catches underneath the part $c$ of the support $a$; the other hooked end $k$ of the device is then inserted in an opening, $l'$, also made in the inner cheek $f$, and the device is then turned until the hook $k$ catches around the arm $a$. The elastic or springy nature of the wire or rod $i\ g$ assists the operation, and enables the device to be adjusted to or removed from the guard with great facility Another method of holding the guard on the wheel is shown in front and side elevation in Figures 11 and 12. A piece of leather, $m$, is placed in the interior of the guard, at the points where it comes in contact with arms $a\ a$, and, extending out upon the exterior of the cheek $f$, receives a clasp or band $o$, provided with two hooks; this clasp is attached to the leather, $m$, by straps, $g$, which pass through a slide, and penetrate through the opening $p$ into the interior of the guard, where they are secured to the bent pieces $c$. On each arm, $a\ a$, are placed rubber rings, $n\ n'$, which are intended for holding in place the guard. When the guard is placed on the wheel, and the leather $m$ is attached by the straps or lashings, $g$, to each of the bent parts $c$, the rubber rings $n\ n'$ are drawn up and caught over the hooks of the clasp $o$, and the position of the guard is thus assured and maintained. As shown in fig. 1, the hind end of the front guard, and the front end of the rear guard extend much lower down upon the wheels than the other ends, in order to fully protect the carriage and its occupants from the mud Having described my invention, and the manner in which the same may be carried into effect, what I claim, and desire to secure by Letters Patent, is—

1. A carriage-guard or hood, covering or extending over the sides and top of the tire or rim of the wheel, substantially as shown and described.

2. The combination, with a wheel and axle, or the equivalents thereof, whose positions relatively to the body of the wagon or other vehicle are variable, of a carriage-guard, so arranged as to constantly maintain the same proximity or relative position to the wheel, substantially as set forth.

3. The combination, with a carriage-guard or hood, covering the top and sides of the wheels, of the arms or supports by which the said guard is held, substantially as shown and set forth.

4. The method of uniting the guard with the arms or supports by which it is held, by means of an elastic and detachable connection, substantially as shown, and for the purposes set forth.

In testimony whereof I have signed my name to this specification before two subscribing witnesses.

I. M. SINGER.

Witnesses:
   A. BLETRY,
   F. F. RANDOLPH.